April 2, 1935. J. J. DURST 1,996,194
LIQUID COOLED FLEXIBLE BRAKE BAND
Filed July 23, 1931 2 Sheets-Sheet 1
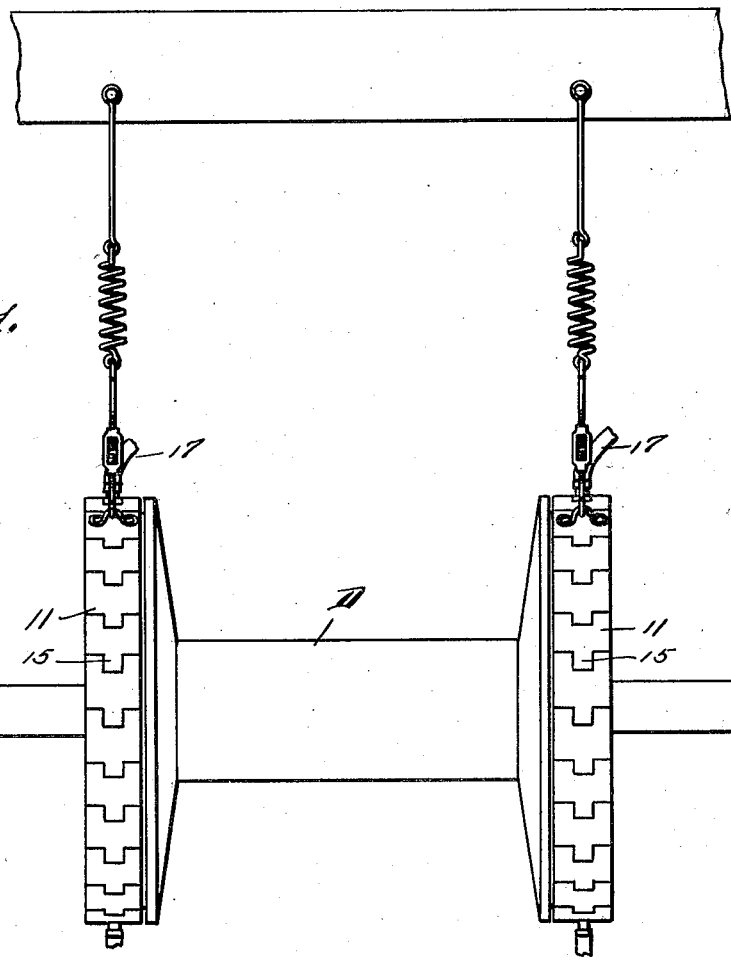
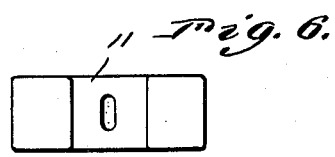
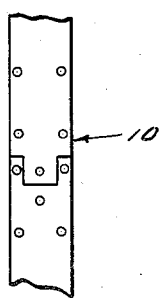
Inventor
J. J. Durst
By Clarence A. O'Brien
Attorney April 2, 1935.  J. J. DURST  1,996,194
LIQUID COOLED FLEXIBLE BRAKE BAND
Filed July 23, 1931  2 Sheets-Sheet 2
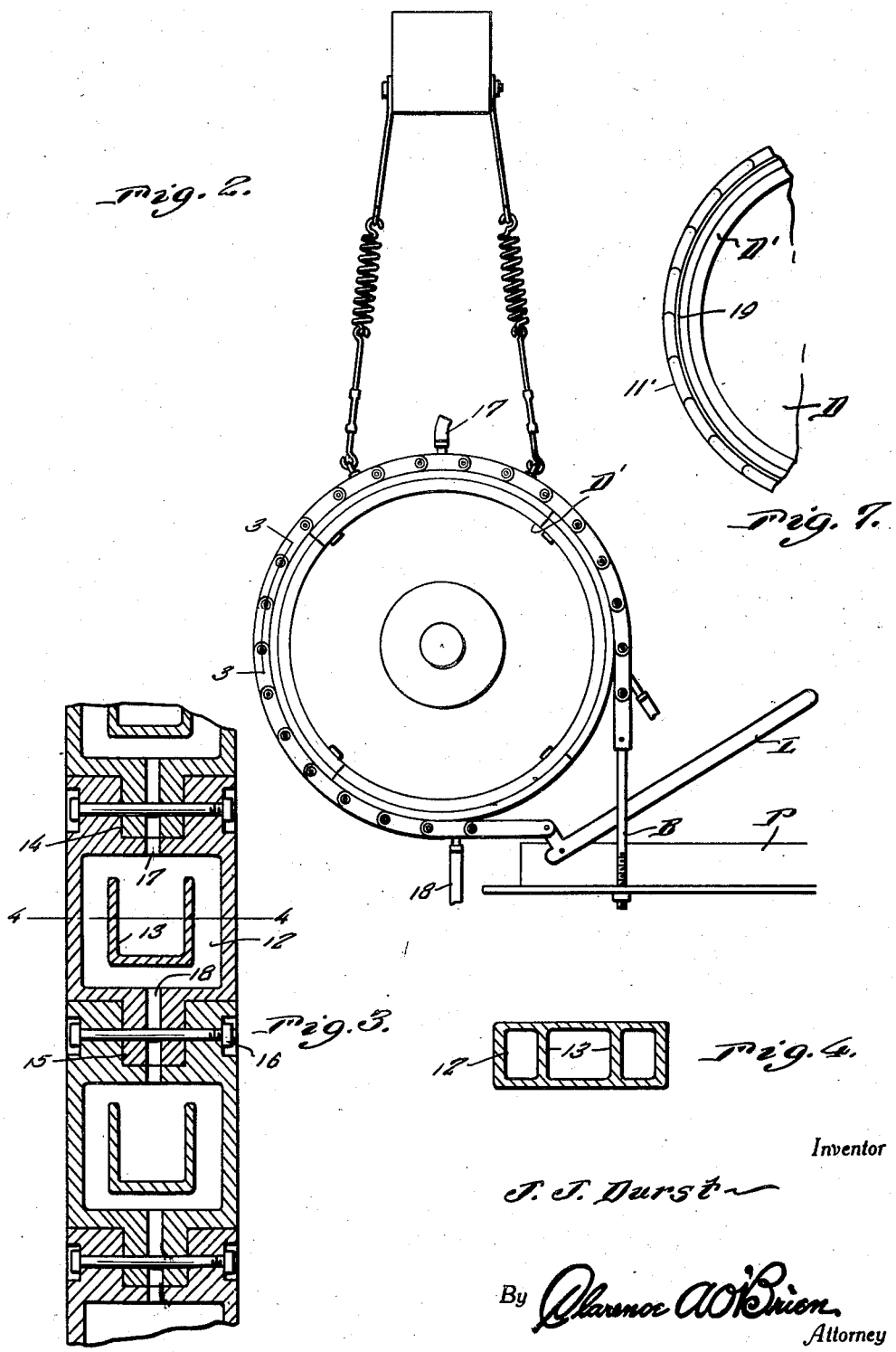
Inventor
J. J. Durst
By Clarence A. O'Brien
Attorney Patented Apr. 2, 1935

1,996,194

UNITED STATES PATENT OFFICE 1,996,194

LIQUID COOLED FLEXIBLE BRAKE BAND

John J. Durst, San Antonio, Tex.

Application July 23, 1931, Serial No. 552,766

5 Claims. (Cl. 188—264)

This invention relates broadly to brake bands, and the primary object of this invention is to provide a brake band especially but not necessarily adapted for use with the brake drum with which the cable winding drum of well tool raising and lowering mechanism are usually equipped.

A still further object of the invention is to provide a brake band of the character above mentioned which can also be used on the calf wheels and bull wheels of well drilling mechanisms, or bailing and pulling mechanisms.

A still further object of the invention is to provide a brake band of the character above mentioned, through which a cooling fluid such as water may be passed, thus improving over the old method of cooling brake drums and bands, which consisted either in pouring water over the brake drum and its band, or in injecting a cooling liquid directly into the drum, wheel or flange.

A still further object of the invention is to provide a flexible brake band through which there may be a continuous flow of water, for cooling purposes.

Other objects and advantages of the invention will become apparent from a study of the following description, taken in connection with the accompanying drawings wherein:

Figure 1 is a front elevational view of a well drilling cable drum, the brake flange or wheel of which is equipped with my improved brake band.

Figure 2 is an end elevational view thereof.

Figure 3 is a longitudinal sectional view taken substantially on the line 3—3 of Figure 2.

Figure 4 is a transverse sectional view taken substantially on the line 4—4 of Figure 3.

Figure 5 is a plan view of a portion of the brake band.

Figure 6 is an end elevational view of a link or section of the brake band.

Figure 7 is a fragmentary elevational view of a slightly modified form of brake band.

With reference more in detail to the drawings, it will be seen that my improved brake band designated generally by the reference character 10 comprises a plurality of similar sections or links 11 each of which, is in the present instance and preferably, of substantially rectangular shell like construction in cross section and is provided with a fluid circulating chamber 12 within which is arranged a substantially U-shaped baffle 13 connecting the top and bottom walls of the chamber 12 and spaced from the side and end walls of the chamber as shown in Figures 3 and 4.

Each section or link 11 at one end is provided with a longitudinal notch or recess 14 and at its opposite end with a longitudinally projecting lug or projection 15.

The links or sections 11 are pivotally connected together, by arranging the projections 15 in the recesses 14, and passing pivot bolts 16 through the links or sections 11 transverse of the notches 14 and through transverse openings extending through the projections 15 (see Figure 3).

Each link or section 11 has its recess connected to the chamber 12 through the medium of an opening 17, and these openings 17 serve in conjunction with longitudinal bores or openings 18 provided in the projections 15 to connect the chambers 12 whereby is provided a fluid circulating passage through the brake drum from one end to the other thereof. In this connection it will be noted, from a study of Figure 3, that the U-shaped baffles 13 have their open sides confronting the apertures 17 so that the water or other cooling fluid passing from one chamber 12 to another, upon entering the chamber 12 will be directed between opposite sides of the baffle 13 and will flow outwardly from between said sides of the baffle to circulate in the chamber 12 about the baffle, finally passing out of the chamber 12 through the passage or bore 18 communicating therewith and provided in the lug or extension 15.

In actual practice, any one of the link sections 17 may be provided in the top thereof with an inlet nipple or like connection serving to couple one end of a hose 17 leading from a suitable source of supply while another of said links or sections 11 preferably adjacent the movable end of the band will be provided with like means for coupling an outlet hose 18 thereto, which hose 18 may return to the source of supply.

As shown in Figure 2, the hose 17 may be coupled to a link or section 11 arranged intermediate the ends of the brake band in which instance, each end link or section 11 may be equipped with a hose 18.

In the present instance, I have shown the brake band as applied to the brake wheel or flange of the cable drum of a well drilling mechanism, the drum being herein designated generally by the reference character D and provided at each end thereof with a circular flange or brake wheel D' about which is disposed the brake band 10. As shown in Figure 2 one end of the band is suitably connected to an operating lever L, while the other end of the band is anchored to the platform P through the medium of the usual anchoring bolt B, or may be connected directly to the mechanism. As shown in Figures 1 and 2, the brake band is suspended from a suitable part of the well drilling mechanism through the medium of resilient suspension devices each of which includes a pair of links secured to a fixed part of the mechanism, a second pair of links suitably engaged with the band, and coil springs connecting the links; the suspension means providing an efficient resilient hanger for the band when the same is in open or inoperative position.

With a brake band of this character, it will be seen that water may flow through the band from one end to the other, the baffles 13 serving to retard or slow the flow of water increasing the cooling effect of the water, so that each link or section of the band will be maintained in a relatively cool state, and the overheating of either the drum or band thus entirely prevented.

Obviously such means of cooling the band and drum overcomes the difficulties and objections to former methods which consisted in either pouring water over the brake band and the brake drum thereby attempting to wet and cool a fast moving wheel, winding drum so forth, etc., which results in causing the brake band to slip, or secondly to build wings into the side of the brake drum in an attempt to cool the braking device the heating of which is of course caused by the rubbing together of the brake band and the brake drum or wheel, or thirdly by introducing a cooling liquid directly into the drum, wheel or flange.

In Figure 7, I have shown a slightly modified form of the invention wherein it will be seen that the links or sections 11' are each secured at one side in any suitable manner to one side of a flexible band 19, the pivot bolt 16 being dispensed with, the one piece band 19 serving to receive the strain. However it is to be understood of course that the link sections 11 will have their lugs or extensions 15 received in the notches or recesses 14 so as to provide a continuous fluid circulating passage from one end to the other of the brake drum. Fluid will be introduced and discharged from the flexible brake drum in this form of the invention in substantially the same manner as that described with respect to the form of the invention shown in Figures 1 to 6 inclusive.

Even though I have herein shown and described the preferred embodiment of the invention, it is to be understood that the same is susceptible of further changes, modifications and improvements coming within the scope of the appended claims.

Having thus described my invention, what I claim as new is:

1. A brake band comprising a plurality of pivotally connected sections, each of which is provided with a recess at one end thereof and a lug projecting therefrom at the opposite end thereof, each of said sections being provided with a water chamber having an inlet adjacent said recess, and an outlet passage extending through said lug.

2. A brake band comprising a plurality of pivotally connected sections, each of which is provided with a recess at one end thereof and a lug projecting therefrom at the opposite end thereof, each of said sections being provided with a water chamber having an inlet adjacent said recess, and an outlet passage extending through said lug, and a substantially U-shaped baffle arranged in said water chamber.

3. A brake band comprising a flexible band and a plurality of shell like sections secured thereto, and provided at one end with a recess and at its relatively opposite end with a projection for reception in a recess of an adjacent section.

4. A brake band comprising in combination a plurality of individual water chambers, relatively short passages connecting the chambers and a baffle arranged in each chamber in operative position to a passage between adjacent chambers.

5. A brake band comprising a plurality of pivotally connected sections each of which is provided with a water chamber, and means forming passages pivotally connecting said sections whereby provision is made for a circulation of water through the brake band from end to end thereof.

JOHN J. DURST.